April 19, 1932.  T. S. MERRYLEES  1,854,853
LIQUID COOLER
Filed March 29, 1929  2 Sheets-Sheet 1
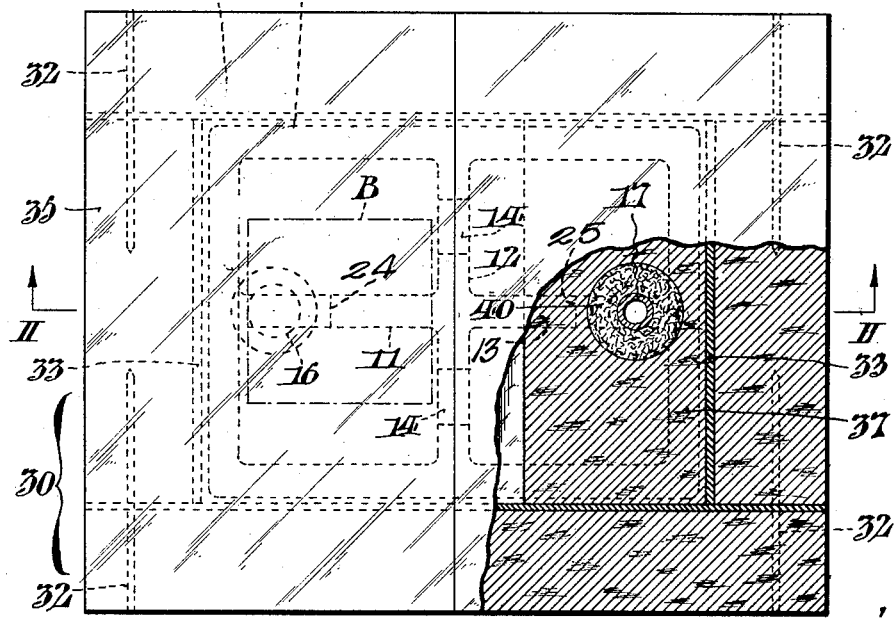
FIG. I.
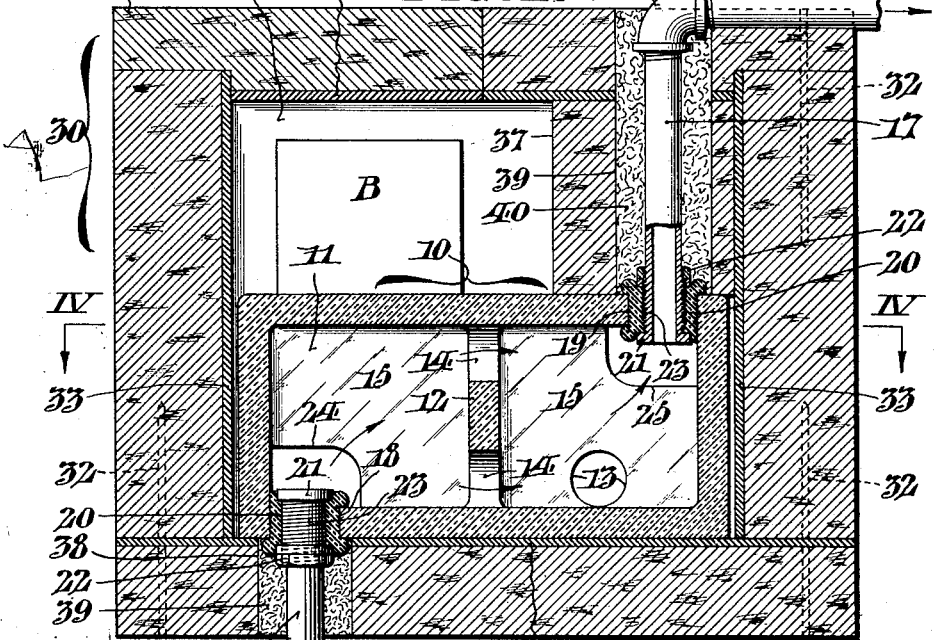
FIG. II.
WITNESSES
Thomas W. Kerr Jr.
William Bell
INVENTOR:
Thomas S. Merrylees,
BY Fraley Paul
ATTORNEYS.

April 19, 1932.  T. S. MERRYLEES  1,854,853
LIQUID COOLER
Filed March 29, 1929  2 Sheets-Sheet 2
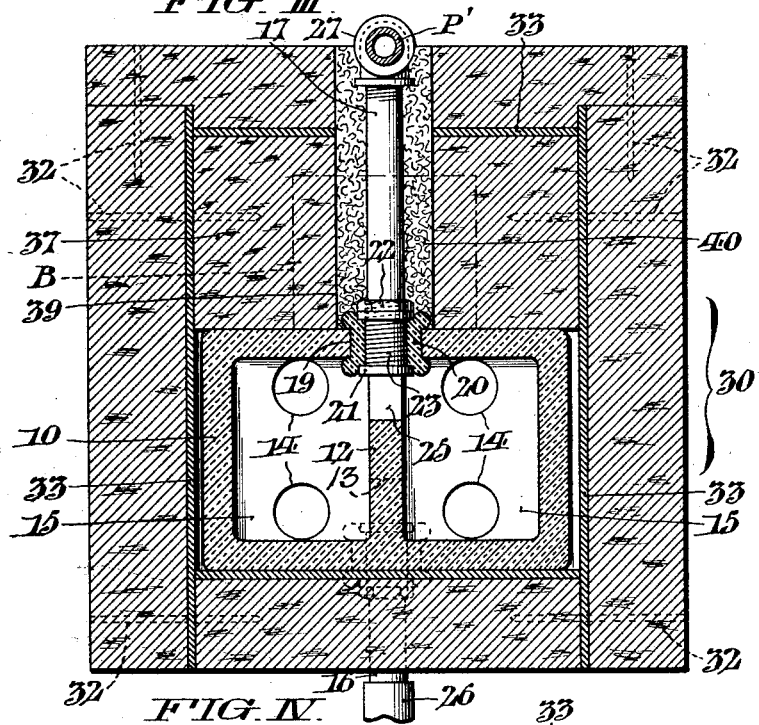
FIG. III.
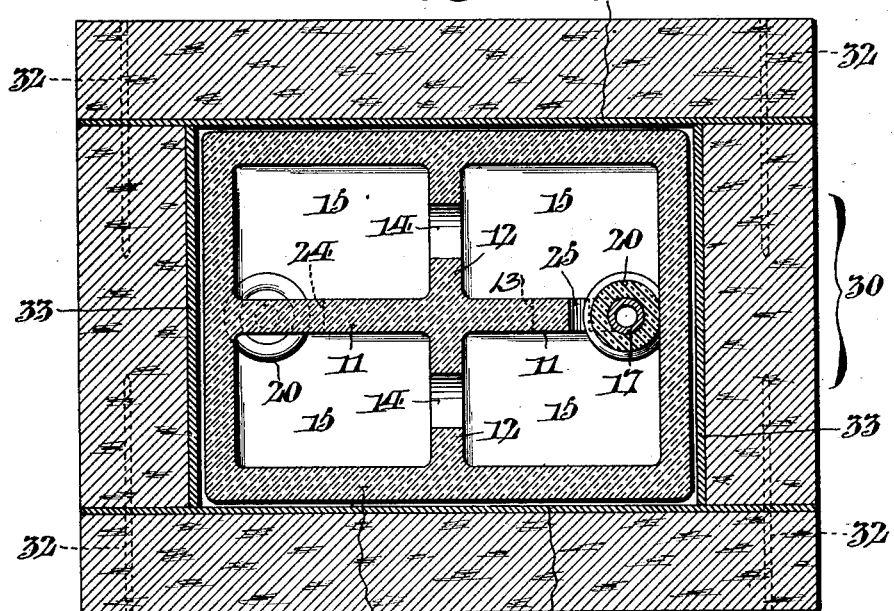
FIG. IV.
WITNESSES
INVENTOR:
Thomas S. Merrylees,
BY
ATTORNEYS.

Patented Apr. 19, 1932

1,854,853

UNITED STATES PATENT OFFICE

THOMAS S. MERRYLEES, OF YEADON, PENNSYLVANIA

LIQUID COOLER

Application filed March 29, 1929. Serial No. 350,953.

This invention relates to coolers for refrigerating liquids, and has more particular reference to coolers intended for refrigeration of drinking water.

The purpose of my invention is to enable cooling of water with the aid of powerful refrigerants like solid carbon dioxide and to attain this end with economic use of the refrigerant incident to maintenance of the water at a palatable drinking temperature above the freezing point. These advantages I aim to secure in a cooler structure which is simple in design and construction, inexpensive to manufacture, capable of easy connection to the water supply lines of dwellings, office buildings, etc., and of affording at all times an adequate supply of cold water under normal conditions of demand upon it.

Still other objects and advantages will appear in the course of the detailed description following of the typical embodiment of this invention shown in the drawings, whereof Fig. I is a plan view of my improved cooler.

Fig. II is a longitudinal sectional view of the structure taken as indicated by the arrows II—II in Fig. I.

Fig. III is a cross section taken as indicated by the arrows III—III in Fig. II; and, Fig. IV is a plan sectional view of the cooler in accordance with the arrows IV—IV in Fig. II.

From these illustrations it will be observed that my improved liquid cooler comprises a refrigerating vessel 10 adapted to be traversed by the liquid being cooled, said vessel being in the present instance made to closed hollow rectangular configuration from ceramic or other material having like thermal properties. As shown to the best advantage in Figs. II, III and IV, the walls of the refrigerating vessel 10 are quite thick; and said vessel is internally subdivided by medial longitudinal and transverse bracing partitions 11, 12 with apertures 13, 14 through them for continuous intercommunication between the subdivisions or cells 15 set apart by said partitioning. In the form herein illustrated, my improved cooler is intended for connection to the water supply lines in buildings, and to this end I provide pipe nipples 16, 17 which extend into inflow and outflow openings 18, 19 respectively in the bottom and the top of the vessel 10 at opposite ends thereof. To secure these pipe nipples 16, 17 fluid tight within the openings 18, 19, I employ bushings 20 of rubber or the like which are compressed, for radial expansion into intimate contact with the edges of said openings, between end shoulder flanges 21 on the nipples 16, 17 and nuts 22 in engagement with threads 23. The connection of the pipe nipples 16, 17 it will be noted, is made along the lengthwise medial vertical plane of the vessel 10, the longitudinal partitioning 11 being cut away to provide clearances at these points as shown at 24, 25 for the purpose. In the present instance, the nipple 16 is fitted with a coupling sleeve 26 to enable connection direct to the water supply pipe P; while the nipple 17 has an attached elbow 27 for coupling to a discharge pipe P' which may lead to a suitable drain faucet, not illustrated.

As shown, a jacket 30 of heavy insulation completely encloses the refrigerating vessel 10 except for provision of a space 31 to accommodate a standardized unit block B of solid carbon dioxide or the like in surface contact with a portion of the vessel top exposed within said space. For convenience in manufacture, the jacket 30 is constructed to the form of a box from boards of cork or cork composition which are secured together by non-metallic dowels 32 preferably of wood. Incident to assembling, the constituent parts of the jacket 30 are buttered with a heavy layer 33 of cementitious material having insulating properties or like sealing composition, and secured with the dowels 32 while said material or composition is still moist, thereby insuring fluid-tight joints all around. A portion 35 of the top of the jacket 30 is removable and serves as a protective closure lid for the refrigerant space 31, said closure lid being likewise constructed from cork or cork composition to correspond with the rest of the jacket 30, and surfaced with cementitious material or sealing composition as shown at 36. Within the jacket 30, the outflow pipe nipple 17 passes through a block 37 of insulation which closes in a portion of the space over the top of the vessel 10, and it is sealed in through the cohesive action of the cementitious material or sealing composition 33 on the adjacent side walls and the fixed portion of the jacket top. To facilitate connection of the pipe nipples 16, 17 during assembling of the structure, openings 38, 39 of a liberal diameter are provided in the jacket 30, such openings being subsequently packed with a fibrous insulating medium 40 such as compressed vegetable fiber, for example. By virtue of embedment in insulatory material 37, 40 as described, the outflow pipe nipple 17 is amply protected against the effects of the solid carbon dioxide block B and thus safeguarded against freezing.

In the operation of the cooler, the refrigerating influence of the carbon dioxide block B is moderated, as a consequence of communication by conduction through the thick walls and partitions of the vessel 10, to the extent of precluding freezing of the water with maintenance of the latter at a cool palatable drinking temperature somewhat above the freezing point. The flow of the water in the structure is shown by the arrows as being upward through the nipple 16, thence circuitously through the several inter-communicating cells 11 of the refrigerating vessel 10, and out through the nipple 17 and discharge pipe P'. The efficient seal formed by the cementitious material or sealing composition 33 prevents downward escape of the free—heavier than air—carbon dioxide gas liberated through sublimation of the block B, so that an atmosphere of the cold gas is at all times maintained within the structure around the vessel 10, it being permitted to escape only by slow seepage upward around the joints between the removable cover lid 35 and the jacket 30.

Having thus described my invention, I claim:

1. A cooler of the character described comprising a closed hollow refrigerating vessel of ceramic material adapted to be traversed by the liquid being cooled, said vessel having capacity to moderate thermic conductivity whereby the liquid is cooled without freezing; and a heavy thermo-insulate jacket completely enveloping said vessel except for a space to accommodate a block of solid carbon dioxide in surface contact with an exposed portion of the vessel.

2. A liquid cooler comprising a closed hollow refrigerating vessel of ceramic material adapted for flow therethrough of the liquid being cooled, said vessel having capacity to moderate thermic conductivity whereby the liquid is cooled without freezing, and a heavy thermo-insulate jacket, completely enveloping said vessel with the exception of a space to accommodate a block of solid refrigerant in surface contact with an exposed face of the vessel.

3. A cooler of the character described comprising a closed hollow refrigerating vessel of ceramic material provided with an inlet and an outlet at opposite ends to predetermine upward horizontal flow therethrough of the liquid being cooled, said vessel having thick walls to moderate thermic conductivity whereby the liquid is cooled without danger of freezing; and a heavy thermo-insulate jacket completely enveloping the refrigerating vessel except for a space to accommodate a block of solid carbon dioxide in surface contact with an exposed upper portion of the vessel.

4. A cooler of the character described comprising a closed hollow refrigerating vessel of ceramic material provided with an outlet and an inlet respectively in its top and bottom at opposite ends to predetermine flow horizontally therethrough of the liquid being cooled, said vessel having thick walls to moderate thermic conductivity whereby the liquid is cooled without danger of freezing; and a heavy thermo-insulate jacket completely enveloping the refrigerating vessel except for a space to accommodate a block of solid carbon dioxide in surface contact with an exposed upper portion of the vessel.

5. A cooler of the character described comprising a closed hollow refrigerating vessel of ceramic material formed interiorly with a number of intercommunicating cells adapted for flow therethrough of the liquid being cooled, the walls of said vessel and cells being comparatively thick to moderate thermic conductivity whereby the liquid is cooled without danger of freezing; and a thick-walled thermo-insulate jacket completely enveloping the refrigerating vessel except for a space to accommodate a block of solid carbon dioxide in surface contact with an exposed top portion of the vessel.

6. A cooler of the character described comprising a closed hollow refrigerating vessel of ceramic material adapted for upward flow therethrough of the liquid being cooled, the walls of said vessel and cells being comparatively thick to moderate thermic conductivity whereby the liquid is cooled without danger of freezing; and a heavy thermo-insulate jacket completely enveloping the refrigerating vessel except for a space to accommodate a block of solid carbon dioxide in surface contact with an exposed upper portion of the vessel top, said jacket being sealed fluid-tight all around and fitted at the top with a removable closure of insulation through which access is had to the space for the refrigerant.

7. A cooler of the character described comprising a closed hollow refrigerating vessel of ceramic material adapted for flow therethrough of the liquid being cooled, the walls of said vessel and cells being comparatively thick to moderate thermic conductivity whereby the liquid is cooled without danger of freezing; a heavy thermo-insulate jacket completely enveloping the refrigerating vessel except for a space to accommodate a block of carbon dioxide in surface contact with the top portion of the vessel; and outflow and inflow piping leading through the insulation of the jacket with nipple ends connecting respectively into and sealed liquid-tight to the top and bottom of the refrigerating vessel at opposite ends thereof with predetermination of horizontal upward flow of the liquid through the latter.

8. A hollow refrigerating vessel for liquid coolers integrally formed wholly of ceramic material with apertured longitudinal and transverse partitioning dividing its interior into a number of intercommunicating cells adapted to be traversed successively by the liquid being cooled, the walls of said vessel and cells being comparatively thick to moderate thermic conductivity.

In testimony whereof, I have hereunto signed my name at Philadelphia, Pennsylvania, this 27th day of March, 1929.

THOMAS S. MERRYLEES.